June 13, 1944.  S. J. BAILEY  2,351,471
MEANS AND METHOD FOR ADJUSTING AND SECURING PRISMS
Filed March 5, 1941
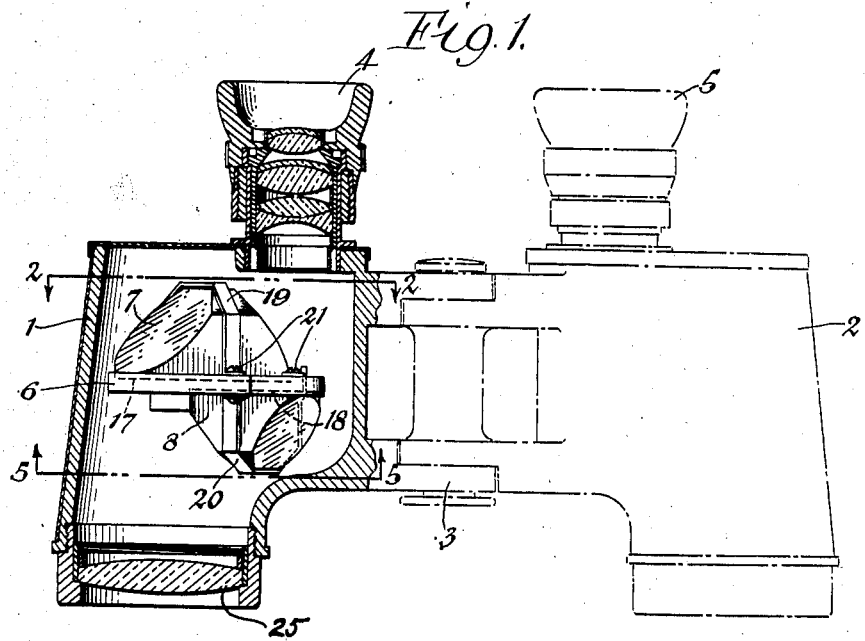
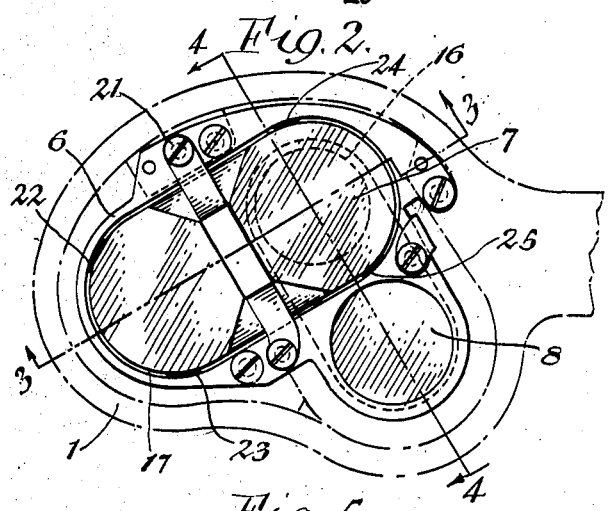
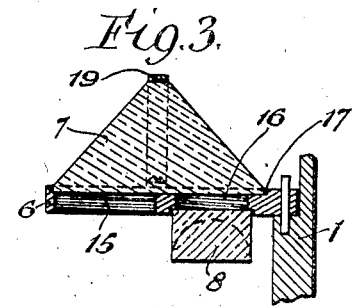
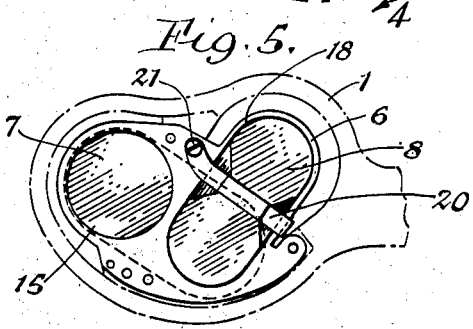
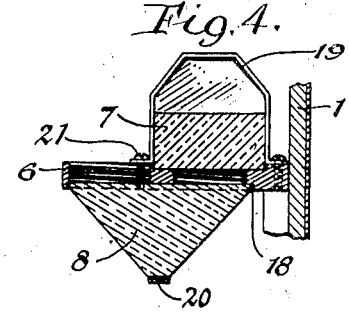
INVENTOR
STANLEY J. BAILEY
BY
Raymond A. Paquin
ATTORNEY Patented June 13, 1944

2,351,471

UNITED STATES PATENT OFFICE 2,351,471

MEANS AND METHOD FOR ADJUSTING AND SECURING PRISMS

Stanley J. Bailey, Snyder, N. Y., assignor to Spencer Lens Company, Buffalo, N. Y., a corporation of New York Application March 5, 1941, Serial No. 381,859

3 Claims. (Cl. 88—33)

This invention relates to prismatic optical devices and has particular reference to a new and improved means and method for aligning the prismatic optical elements of such devices and for securing said prismatic optical elements in aligned position.

An object of the invention is to provide a new and improved means and method for aligning and securing the prismatic optical elements in an optical device which will prevent any strain from being set up in said prismatic elements.

Another object is to provide means and method of mounting prismatic optical elements so that they will not be moved out of alignment by shocks to the instrument.

Another object of the invention is to provide a new means and method of mounting prismatic optical elements which will not be affected by moisture or drying out.

Another object of the invention is to provide new and improved means and method for adjusting and securing prismatic optical elements in optical devices which will allow greater angular tolerances in the manufacture of the mounting and which will allow the prismatic element to be easily and quickly aligned with or adjusted to desired relation with the remainder of the optical system and to be permanently secured in said adjusted relation.

Other objects and advantages of the invention will be apparent from the following description taken in connection with the accompanying drawing. It will be understood that many changes may be made in the details of construction, arrangement of parts and steps of the process without departing from the scope of the invention as expressed in the accompanying claims. I therefore do not wish to be limited to the exact details of construction, arrangement of parts and steps of the process shown and described as the preferred form and process have been set forth by way of illustration only.

Referring to the drawing:

Fig. 1 is a top plan view, partly in section, of a prism binocular constructed according to the invention;

Fig. 2 is a sectional view taken on line 2—2 of Fig. 1 looking in the direction of the arrows;

Fig. 3 is a sectional view taken on line 3—3 of Fig. 2 looking in the direction of the arrows;

Fig. 4 is a sectional view taken on line 4—4 of Fig. 2 looking in the direction of the arrows; and Fig. 5 is a sectional view taken on line 5—5 of Fig. 1 looking in the direction of the arrows.

In the prior art numerous ways have been devised to allow alignment of and hold prismatic optical elements in desired aligned relation with the remainder of the optical system. These former devices have consisted of various mechanical arrangements which were expensive and had various drawbacks such as becoming loose from shocks, etc., received by the article during use and frequently temperature changes caused expansion or contraction of the holder and prism and as their coefficient of expansion was not the same, strain was set up in the prism which weakened the prism and sometimes caused the same to break.

Also, where a mechanical device was employed, it was necessary that the manufacturing tolerances on both the prisms and holding device be very narrow or limited and that they be strictly adhered to. This considerably increased the cost of such devices and there was also considerable loss in the manufacture thereof due to the necessary narrow limits of the manufacturing tolerances. It is, therefore, a primary object of the present invention to provide a new means and method for aligning and securing prismatic optical elements in optical devices which will allow the prismatic element to be easily and quickly aligned with the remainder of the optical system and then be easily and quickly secured in said aligned relation in such a manner that no strain will be set up in the said prismatic element nor will the alignment of said prismatic element be changed or affected in any way by any shocks received during the use of the device and which will also allow removal of the prismatic element for cleaning or the like.

Referring to the drawing wherein similar reference characters designate corresponding parts throughout the several views, the prism binocular device shown embodying the invention comprises a pair of casings 1 and 2 pivotally connected by the hinge arrangement 3 and each having an eyepiece 4 and 5 and objective 25.

Each of the casings 1 and 2 contains a prism plate 6 each supporting a pair of prisms 7 and 8. The prism plate or support 6 is provided with the openings 15 and 16 to allow the passage of light therethrough. The prismatic elements 7 and 8 are adapted to be placed on opposite sides of said plate 6 at a ninety degree angle with each other, as shown in Fig. 2, with one end of the prisms overlapping to allow the light to be reflected from one prism to the other and then into the eyepiece.

The prism plate or support 6 is formed with the recesses 17 and 18 one on each side thereof and overlapping each other at a ninety degree angle with each other and into these recesses are positioned the prism members 7 and 8 respectively and which are secured therein by means of the strap members 19 and 20 respectively which are secured to said prism plate or support 6 by screws or the like 21.

There is preferably positioned between the top of each of the prisms 7 and 8 and its respective strap 19 and 20 a small piece of resilient material such as rubber or cork to compensate for the expansion of the prismatic elements which are usually formed of glass or the like. This allows the prisms to expand or contract with the changes in temperature without setting up any strain in the prism.

The said recesses 17 and 18 are formed slightly larger than the base of the prism to be inserted therein. It will be noticed that these recesses are formed at a ninety degree angle with respect to each other, which is the angle at which the prisms are desired to be placed. It will also be noted that this angle may be changed as desired according to the angle at which it is desired to place the prisms relative to each other.

The prismatic members 7 and 8 are then placed in their respective recesses 17 and 18 and secured therein by means of the straps 19 and 20. Then either one or both of the prismatic elements 7 and 8 may be adjusted for alignment with the other prism by rocking or pivoting the prism in its recess until the desired alignment is reached. In the case of the prism binocular shown the angle between the two would be exactly ninety degrees. The adjusted prism is then secured in its adjusted position by inserting a suitable substance between the sides of the prism and the wall of the recess at the spaced points 22, 23, 24 and 25. This substance is placed in the recess between the edge of the prism and the surrounding side of the recess to fill the space and securely retain the prism in adjusted position. If desired instead of placing this material at spaced points it may be placed around the end of the prism joining the spot 22 with spot 23 and the spot 24 with the spot 25 and might even be placed entirely around the prism if desired to more securely lock the prism in adjusted position.

The substance employed may be a low melting point fusible alloy or a cementitious substance or the like and may be inserted by the use of a hypodermic syringe with a special needle. Where a heat softenable material is employed it is necessary to heat the syringe and this may be done by any desired known means, for instance with a high frequency circuit.

It is pointed out that the recess for one of the prisms may if desired be made of precisely the same size and shape as the shape of the prism which is securely retained in said position by its strap in which case it is only necessary to have one of the prisms adjustable, but if a greater degree of adjustment for alignment is desired both of the prisms may be mounted by the method hereinabove described.

It is also pointed out that where it is desired to remove the prisms for cleaning or the like, if the securing medium employed is a low melting point heat softenable material it is only necessary to apply heat to soften the securing medium and then by removing the screws 21, remove the strap to allow removal of the prism. If a cementitious substance or the like is employed, then a solvent might be applied to soften the securing medium to allow removal of the prism by removing the strap as described above. The prism or new prisms may then be applied in the same manner as originally described above for originally securing the prisms.

It will be seen that by employing the construction and method herein described, the metal parts and the prismatic elements are allowed to expand without setting up any strain in the prism and also that the securing medium of low melting point metal or cementitious substance is more or less elastic and forms a cushion for any jar or shock to the prismatic element. It will also be seen that because of the adjustability of the prismatic element and the use of the securing material, wider manufacturing tolerances are allowed on the metal parts of the device and greater tolerances are allowed in the size of the prisms as the method allows adjustment to compensate for any slight variation in the size of the prism. This facilitates and makes considerably more economical the manufacture of prismatic optical devices.

From the foregoing it will be seen that I have provided simple, efficient and economical means for obtaining all of the advantages of the invention.

Having described my invention, I claim:

1. In a device of the character described, a support, a recess in one surface of said support adapted to support a prism, said recess being greater in area that the prism to be supported therein, a prism in said recess, and having portions of its periphery spaced from the wall of said recess, means for retaining said prism in said recess and plastic spacing means at spaced points only between the periphery of said prism and the wall of said recess to retain the said prism in aligned position, whereby said prism may be secured in optical alignment with the other elements of an optical system.

2. In a device of the character described, a support, a recess in one surface of said support adapted to support a prism, said recess being greater in area than the prism to be supported therein, a prism in said recess, and having portions of its periphery spaced from the wall of said recess, means for retaining said prism in said recess and fusible spacing means at spaced points only between the periphery of said prism and the wall of said recess to retain the said prism in aligned position, whereby said prism may be secured in optical alignment with the other elements of an optical system.

3. In a device of the character described, a support, a recess in one surface of said support adapted to support a prism, said recess being greater in area than the prism to be supported therein, a prism in said recess, and having portions of its periphery spaced from the wall of said recess, means for retaining said prism in said recess and cementitious spacing means at spaced points only between the periphery of said prism and the wall of said recess to retain the said prism in aligned position whereby said prism may be secured in optical alignment with the other elements of an optical system.

STANLEY J. BAILEY.